United States Patent Office 2,841,599
Patented July 1, 1958

2,841,599

PROCESS FOR MAKING CRYSTALLINE CORTISONE ACETATE

Barney J. Magerlein, Kalamazoo, and Jack K. Dale, Kalamazoo Township, Kalamazoo County, Mich., and Louis W. Wachtel, Frederick, Md., assignors to The Upjohn Company, Kalamazoo, Mich., a corporation of Michigan No Drawing. Original application November 26, 1954, Serial No. 471,511. Divided and this application January 10, 1957, Serial No. 634,602

1 Claim. (Cl. 260—397.45)

This application is a division of application Serial No. 471,511, filed Nov. 26, 1954, now abandoned.

This invention relates to new crystalline forms of cortisone acetate, to methods for the preparation thereof and to stable aqueous suspensions containing these new crystalline forms of cortisone acetate.

The preparation of stable aqueous suspensions of cortisone acetate has presented considerable difficulties. For example, after a relatively short period of time, aqueous suspensions of crystalline cortisone acetate are characterized by undesirable crystal growth, or caking and sedimentation. Furthermore, these unstable suspensions cannot be re-suspended by vigorous shaking and consequently their physical properties are altered to such a degree as to make them unsatisfactory for therapeutic use. For example, large crystals are a source of great irritation to patients and in addition cannot pass through fine hypodermic needles. In view of the paucity of information regarding the mechanism of crystal growth or caking and sedimentation in aqueous suspensions of cortisone acetate, the determination of the cause of or prevention of these undesirable physical phenomena has been extremely difficult. The problem is further complicated by the fact that cortisone acetate is now known to exist in various polymorphic forms, only one of which has been known to produce stable, non-caking aqueous suspensions (U. S. Patent 2,671,750).

Prior attempts to prepare crystalline cortisone acetate in forms which are stable, i. e., characterized by the absence of undesirable crystal growth, or caking and sedimentation, when suspended in an aqueous medium, have been unsuccessful. For example, the preparation of stable aqueous suspensions of cortisone acetate of particle size suitable for injection by continuously ball-milling unstable suspensions of cortisone acetate was unsatisfactory. When glass balls were used in the mill, these tended to fracture or wear down and consequently, glass particles were found in the aqueous suspensions of cortisone acetate. Similarly, foreign particles were also found when alundum, porcelain or corundum were substituted for glass. The use of stainless steel or chrome steel balls was likewise unsatisfactory since these materials discolored the products. Attempts to avoid these difficulties by stirring micronized cortisone acetate in an aqueous vehicle for several days were usually unsuccessful regardless of crystal size of the micronized powder. Similar experiments using vehicles presaturated with cortisone acetate of various crystal forms were likewise only partially successful. The fact that these processes were not always reproducible made them impractical.

It is an object of the invention to provide novel forms of crystalline cortisone acetate. Another object of the invention is to provide novel forms of crystalline cortisone acetate which will form stable, non-caking aqueous suspensions when suspended in an aqueous medium. Another object of the invention is to provide methods for the preparation of these new crystalline forms of cortisone acetate. Other objects of the invention will be apparent to those skilled in the art to which this invention pertains.

The invention provides new types of cortisone acetate in crystalline form and aqueous suspensions thereof which are characterized by the absence of crystal growth. These preparations re-suspend easily even after extended periods of time and do not cake or clump.

The process for the preparation of new crystalline forms of cortisone acetate comprises dissolving cortisone acetate in an inert water-miscible organic solvent, mixing the resulting solution with a second solvent selected from the group consisting of water and a water-immiscible hydrocarbon solvent fraction obtained from a petroleum distillate, said water-immiscible hydrocarbon solvent having a boiling point between about 25 and about 150 degrees centigrade, in which the cortisone acetate is insoluble, to obtain new forms of crystalline cortisone acetate.

In a more specific embodiment of the invention, cortisone acetate, in any polymorphic modification, is dissolved in a water-miscible organic solvent. Suitable water-miscible organic solvents include methyl Cellosolve (ethylene glycol monomethyl ether), ethyl Cellosolve (ethylene glycol monoethyl ether), Carbitol (diethylene glycol monoethyl ether), Carbitol acetate, propylene glycol, ethylene glycol, butylene glycol, polyethylene glycols of molecular weight between about 1500 and about 6000, ethanol, dimethylacetamide, acetone, methanol, acetic acid, propanol, 2-propanol, benzyl alcohol, and the like, the cellosolves such as methyl Cellosolve, ethyl Cellosolve, and the like, being especially preferred. In dissolving the steroid in the water-miscible organic solvent, the use of heat, i. e., temperatures up to about the boiling point of the mixture, is ordinarily preferred to facilitate the dissolution of the cortisone acetate in the selected solvent.

After dissolving the cortisone acetate in the selected water-miscible organic solvent, the resulting solution is then mixed with a second solvent in which the steroid is insoluble. The latter group of solvents include water and various hydrocarbon solvents boiling between about 25 degrees and about 150 degrees centigrade, obtained as fractions from petroleum distillates such as, for example, Skellysolve A (essentially n-pentane) boiling between 28 and 38 degrees centigrade,
Skellysolve A Special (essentially isopentane) boiling between 26 and 31 degrees centigrade,
Skellysolve B (essentially n-hexane) boiling between 60 and 71 degrees centigrade,
Skellysolve C (essentially n-heptane) boiling between 85 and 100 degrees centigrade,
Skellysolve D (essentially mixed heptanes) boiling between 77 and 115 degrees centigrade,
Skellysolve E (essentially mixed octanes) boiling between 100 and 140 degrees centigrade,
Skellysolve F (essentially petroleum ether) boiling between 30 and 60 degrees centigrade,
Skellysolve G (essentially petroleum ether) boiling between 40 and 75 degrees centigrade,
Skellysolve H (essentially light naphtha) boiling between 60 and 100 degrees centigrade,
Skellysolve L (essentially a light lacquer diluent) boiling between 93 and 129 degrees centigrade,
Skellysolve R (essentially a rubber solvent naphtha) boiling between 54 and 129 degrees centigrade, and the like.

When a solution of steroid in a water-miscible solvent is mixed with water, the volume of steroid solution to water should be in a ratio of at least 1:1 and preferably between about 1:5 and about 1:50. The temperature of the water should be less than seventy degrees centigrade and preferably between about zero and about twenty degrees centigrade. On thoroughly mixing the steroid solution with water, a moist microcrystalline product is obtained which is designated as form A. The moist crystalline material is stable in aqueous vehicles. This product does not exist in dry form. The crystalline product is further characterized by the following X-ray diffraction data:

INTERPLANAR SPACING, A.

| | |
|---|---|
| 15.49 | 3.34 |
| 10.10 | 3.18 |
| 8.62 | 3.02 |
| 5.98 | 2.88 |
| 5.50 | 2.76 |
| 5.05 | 2.56 |
| 4.68 | 2.38 |
| 4.35 | 2.33 |
| 4.13 | 2.23 |
| 3.46 | |

The X-ray data for this and other forms of cortisone acetate indicated below were obtained by the powder method using a Picker-Waite diffraction unit with nickel filtered copper $K\alpha_1$ radiation. The sample was prepared by placing crystals in a suspension in a plastic capillary tube sealed at one end with paraffin and alternately centrifuging and refilling to pack the moist crystals. The capillary tube was then sealed at the other end. Moisture transfer through the plastic capillary tube was controlled by maintaining a moisture-saturated atmosphere within the diffraction camera.

The crystalline product is clearly distinguishable from Merck form 5 (U. S. 2,671,750) in that the particle size of 98 percent of crystals is less than twenty microns in length and further in that form A possesses an optic axial angle of five degrees while Merck form 5 possesses an optic axial angle of 69.5 degrees. The difference in optic axial angle values is a significant and important difference in that the angle is a function of the three principal refractive indices (optic axial angle, 2 V, is the smaller angle between the optic axes and lies in the optic plane—Wahlstrom, "Optical Crystallography," second edition, 1951, page 145).

On co-distilling the above described crystalline product with a water-immiscible hydrocarbon solvent obtained from a petroleum distillate as a fraction boiling between about 25 degrees and about 150 degrees centigrade, and in which the cortisone acetate is insoluble, and separating and drying the resulting crystalline material by conventional procedures, the starting material is converted to a new form of crystalline cortisone acetate, designated as form B. The crystalline product is characterized by the following X-ray diffraction data:

INTERPLANAR SPACING, A.

| | |
|---|---|
| 13.9 | 5.9 |
| 10.7 | 5.5 |
| 6.83 | 5.12 |
| 4.74 | 2.78 |
| 4.35 | 2.61 |
| 3.9 | 2.54 |
| 3.64 | 2.47 |
| 3.42 | 2.32 |
| 3.24 | 2.24 |
| 3.11 | 2.16 |
| 2.87 | |

The product significantly is not only stable in dry form but also in aqueous suspension and further, 98 percent of the crystals have a particle size between about forty and about sixty microns in length.

While the X-ray diffraction pattern of form B is similar to that of Merck form 1, it is to be noted that Merck form 1 is not stable in aqueous suspension.

When the solution of cortisone acetate in a water-miscible organic solvent is mixed thoroughly with a hydrocarbon solvent obtained from a petroleum distillate as a fraction boiling between about 25 and 150 degrees centigrade, and in which the steroid is insoluble, and the resulting crystalline material separated and dried by conventional means, a new microcrystalline product, designated as form C is obtained. The crystalline product is characterized by the following X-ray diffraction data:

INTERPLANAR SPACING, A.

| | |
|---|---|
| 13.2 | 3.65 |
| 10.5 | 3.36 |
| 8.84 | 3.22 |
| 7.69 | 2.63 |
| 6.70 | 2.48 |
| 6.17 | 2.35 |
| 5.30 | 2.26 |
| 4.68 | 2.18 |
| 4.32 | 2.13 |
| 3.79 | 1.97 |

The product significantly is stable not only in dry form but also in aqueous suspension and further, 98 percent of the crystals have a particle size between about forty and about sixty microns in length.

While the X-ray diffraction pattern of form C is similar to that of Merck form 3, it is to be noted that Merck form 3 is not stable in aqueous suspension.

When the cortisone acetate is dissolved in a polyethylene glycol of a molecular weight between about 1500 and about 6000, the dissolution of the steroid in the solvent being facilitated by heating at a temperature between about 180 and about 200 degrees centigrade, and the resulting solution is cooled, a solid material is obtained. On mixing the solid material with water, there is obtained a moist crystalline material which is identified as form A. This product is identical with crystalline cortisone acetate form A described supra except for the fact that 98 percent of this crystalline material has a particle size of less than ten microns in length.

The various forms of cortisone acetate including Merck form 5, disclosed in U. S. Patent 2,671,750, are further characterized in the following table.

| | Form A | Form B | Form C | Form 5 (U. S. 2,671,750) |
|---|---|---|---|---|
| Crystal System | | Orthorhombic | Monoclinic | Orthorhombic. |
| Common Orientation | BxA | BxA | BxA | BxA. |
| Optic Sign | Positive | Positive | Positive | Positive. |
| Dispersion | None | None | R>V | R>V. |
| Optic Axial Angle | 5° | 73° | 76° | 69.5°. |
| Refractive Indices | (*) | | | |
| $\alpha$ | | 1.518 | 1.518 | 1.506. |
| $\beta$ | | 1.552 | 1.552 | 1.532. |
| $\gamma$ | | 1.621 | 1.613 | 1.591. |
| Optic Orientation | (*) | $\begin{cases} a=Z \\ b=X \\ \text{optic plane}=001 \end{cases}$ | $b=Y$ $a \wedge Z=44°$ optic plane = 010. | $a=Z$ $b=X$ optic plane = 001. |

*Refractive indices and optic orientation not obtainable because form A could not be obtained in a dry crystalline form.

The following examples illustrate the products and the methods of carrying out the present invention, but it is to be understood that these examples are given for purposes of illustration only and not by way of limitation.

Example 1

To twenty milliliters of methyl Cellosolve is added 5.2 grams of cortisone acetate NNR. The dissolution of the cortisone acetate in the solvent is facilitated by heating at a temperature of 100 degrees centigrade. The resulting solution is then sterilized by passing through a Hormann filter and using aseptic technique was slowly poured, while stirring, into 700 milliliters of sterile deionized water. After stirring for an additional fifteen minutes, the sterile suspension is filtered and washed with sterile deionized water. A yield of 5.0 grams of moist microcrystalline sterile cortisone acetate melting between 230 and 237 degrees and designated as form A is obtained. Ninety-eight percent of the crystalline material has a particle size of less than twenty microns in length.

Following the procedure described above except for the replacement of methyl Cellosolve by other water-miscible organic solvents such as ethyl Cellosolve, Carbitol, Carbitol acetate, benzyl alcohol, propylene glycol, ethylene glycol, and the like, moist crystalline cortisone acetate, form A, is likewise obtained.

The sterile crystalline cortisone acetate thus obtained by aseptic processing was made up to a volume of 200 milliliters with a sterile vehicle containing, per milliliter,

| | |
|---|---|
| Sodium carboxymethylcellulose_____milligrams__ | 5 |
| Low viscosity sodium chloride_____do____ | 9 |
| Tween-80 U. S. P_____do____ | 4 |
| Benzyl alcohol N. F_____do____ | 15.75 |
| Deionized water q. s_____milliliter__ | 1 |

The sterile suspension was then stirred for ten minutes in a sterile Waring blender. No crystal growth was noted in the suspension after storage for six months at temperatures of 25 degrees centigrade, forty degrees centigrade and 47 degrees centigrade. This suspension is suitable for intramuscular injection.

Example 2

Fifty grams of cortisone acetate NNR is dissolved in 500 milliliters of methyl Cellosolve. Heating at a temperature between 100 and 115 degrees centigrade is utilized to facilitate the dissolution of the cortisone acetate in the methyl Cellosolve. Three grams of Tween-80 (a polyoxyalkylene derivative of sorbitan monooleate) is added to the solution. To the resulting solution is added, accompanied by vigorous stirring, a cooled solution (four degrees centigrade) of three grams of Tween-80 in eight liters of deionized water. The resulting suspension is then filtered and the moist crystalline material thus obtained is washed successively, two or three times, with two liters of deionized water. A yield of 45.0 grams of moist microcrystalline cortisone acetate is obtained as crystal form A. Ninety-eight percent of the crystalline product has a particle size of less than twenty microns in length.

To the moist microcrystalline cortisone acetate is added a sufficient quantity of the vehicle described in Example 1 to make a total volume of 1.5 liters. The suspension is passed through a colloid mill with a setting of 0.005" and the mill is washed with a sufficient quantity of vehicle to give a final volume of 1.8 liters. The suspension is mixed thoroughly and then sterilized. The final product contains 25.0 milligrams of cortisone acetate per milliliter and has a pH of 5.9. Ninety-eight percent of the microcrystalline material has a particle size of less than twenty microns in length. After storage for six months at room temperature, the particle size of the microcrystalline cortisone acetate remained unchanged. The product is suitable for intramuscular injection.

Example 3

Twenty-five grams of cortisone acetate NNR is dissolved, while stirring, in 250 milliliters of methyl Cellosolve. Heating at a temperature between 110 and 115 degrees centigrade is utilized to facilitate the dissolution of the steroid in the solvent. The solution is then poured, accompanied by stirring, into 2.5 liters of Skellysolve B. The crystalline material thus obtained is then washed with three 250-milliliter portions of Skellysolve B and then dried to a constant weight at a temperature between eighty and ninety degrees centigrade. There is obtained a yield of 23 grams of crystalline cortisone acetate, designated as form C, and further characterized by a melting point between 230 and 240 degrees centigrade, an ultraviolet extinction coefficient $E_{239}=15{,}800$ and an optical rotation $[\alpha]_D^{22}=+178$ degrees (acetone). Ninety-eight percent of the crystalline material thus obtained has a particle size between about forty and about sixty microns in length.

If the crystalline material supra is only partially dried, a mixture of forms C and A is obtained. The mixture of forms C and A is stable in aqueous vehicles.

Following the procedure described above except for the replacement of methyl Cellosolve by other water-miscible organic solvents such as ethyl Cellosolve, Carbitol, Carbitol acetate, benzyl alcohol, propylene glycol, ethylene glycol, and the like, and the substitution of Skellysolve B by other hydrocarbon solvents obtained from petroleum distillates as fractions boiling between about 25 and about 150 degrees centigrade such as Skellysolve A, Skellysolve C, Skellysolve D, Skellysolve E, Skellysolve F, and the like, cortisone acetate, form C is likewise obtained.

The microcrystalline cortisone acetate (form C) thus obtained is sterilized by the use of ethylene oxide gas and the following suspension is prepared:

| | |
|---|---|
| Cortisone acetate, form C_____milligrams__ | 25 |
| Sodium carboxymethylcellulose_____do____ | 20 |
| Sodium chloride_____do____ | 9 |
| Quatresin (myristyl gamma picolinium chloride) milligrams__ | 0.233 |
| Deionized water q. s_____milliliter__ | 1 |

The sterile suspension thus obtained is repeatedly passed through a sterile colloid mill. There is no evidence of caking or crystal growth in the suspension after storage for six months at room or elevated temperatures. The suspension readily passes through a 21 gauge needle and is suitable for intramuscular injection.

Example 4

One liter of methyl Cellosolve is heated between 110 and 115 degrees centigrade and 100 grams of cortisone acetate NNR is then dissolved therein, accompanied by stirring. Three grams of Tween-80 is then added to the solution. The resulting solution is then mixed with a cooled solution (four degrees centigrade) containing 3.0 grams of Tween-80 and sixteen liters of deionized water. The crystalline material thus obtained is removed from the suspension by filtration and then washed with three liters of deionized water. Five liters of Skellysolve B is added thereto and the solution is heated under reflux, accompanied by stirring, until water is no longer co-distilled with the Skellysolve B (a period between about six and about eight hours). The suspension is cooled to 25 degrees centigrade, filtered and then dried to constant weight in vacuo at eighty degrees centigrade. There is obtained 95 grams of crystalline cortisone acetate, as crystal form B and characterized by a melting point between 236 and 245 degrees centigrade, optical rotation $[\alpha]_D^{22}=+177$ degrees (acetone) and an ultraviolet extinction $E_{239}=15{,}350$. Ninety-eight percent of the crystalline material thus obtained has a particle size between about forty and about sixty microns in length.

Following the procedure described above except for the replacement of methyl Cellosolve by other water-miscible organic solvents such as ethyl Cellosolve, Carbitol, Carbitol acetate, benzyl alcohol, propylene glycol, ethylene glycol, and the like, and the substitution of Skellysolve B by other hydrocarbon solvents obtained from petroleum distillates as fractions boiling between about 25 and about 150 degrees centigrade such as Skellysolve A, Skellysolve C, Skellysolve D, Skellysolve E, Skellysolve F, and the like, cortisone acetate, form B is likewise obtained.

The following vehicle is prepared:

| | | |
|---|---|---|
| Quatresin | grams | 4.43 |
| Polyethylene glycol 4000 | do | 2280 |
| Sodium citrate | do | 85.5 |
| Neomycin sulfate | do | 114 |
| Prophenpyridamine maleate NNR | do | 47.5 |
| Deionized water q. s | cc | 18,900 |

The pH of the solution is adjusted between 6.0 and 6.5 with ninety percent phosphoric acid and the final volume of the resulting solution is adjusted to 19,000 milliliters.

Ninety-five grams of microcrystalline cortisone acetate, form B (supra), is added to the vehicle and the resulting suspension is passed through a colloid mill three times at a setting of 0.002". There is no evidence of caking or crystal growth in the suspension after storage for a year at room temperature. The suspension is suitable as a nosedrop preparation.

Example 5

Eleven grams of cortisone acetate is dissolved in eighty grams of Carbowax 4000 (polyethylene glycol of molecular weight of 4000). To increase the rate of solution, gentle warming and stirring are used. The resulting solution is then poured into 575 cubic centimeters of water (cooled to a temperature of twenty degrees centigrade). There is obtained crystalline cortisone acetate as crystal form A. Ninety-eight percent of the crystalline material has a particle size of less than ten microns in length. Except for the particle size, this product possesses characteristics identical with form A supra.

Following the procedure described above except for the replacement of Carbowax 4000 by Carbowax 1500, Carbowax 6000, and the like, cortisone acetate, form A is likewise obtained.

The microcrystalline cortisone acetate suspension thus obtained is preserved and made isotonic by the addition of 3.66 grams of chlorobutanol, 130 milligrams of Quatresin and three grams of sodium citrate. There is no evidence of crystal growth in the resulting suspension after storage for six months at temperatures of four degrees, 25 degrees and forty degrees centigrade. The suspension is suitable as a nosedrop preparation.

Example 6

Eleven grams of cortisone acetate and eighty grams of Carbowax 4000 are dissolved in 150 milliliters of methylene dichloride. Gentle warming and stirring are used to increase the rate of solution. The resulting solution is then filtered through a sintered glass funnel and washed with fifty milliliters of methylene dichloride. The solution thus obtained is then distilled to remove the methylene dichloride and the residue heated, with gentle stirring, to a temperature between 180 and 200 degrees centigrade (the use of methylene dichloride facilitates removal of foreign matter and also increases the rate of solution). The solution of cortisone acetate in Carbowax is then poured onto a well chilled smooth surface so that rapid solidification occurs.

The crystalline product is passed through a thirty mesh screen and then sterilized with ethylene oxide gas. Four grams of neomycin sulfate powder, blended, 130 milligrams of Quatresin, 660 milligrams of polyvinyl pyrrolidone and three grams of sodium citrate are dissolved in 500 milliliters of water. The solution is then sterilized by passage through a Hormann filter and the sterile crystalline cortisone acetate obtained supra is added thereto. The resulting mixture is aseptically stirred at room temperature for fifteen to thirty minutes, diluted to a volume of 666 milliliters, passed through a sterile colloid mill, adjusted to a pH of 6.8 to 7.4 with a sterile five percent sodium hydroxide solution and then bottled in sterile vials. The product is a stable sterile suspension containing crystalline cortisone acetate, form A, 98 percent of said crystalline cortisone acetate having a particle size of less than ten microns in length. There is no evidence of crystal growth after storage for six months at temperatures of zero degrees, 25 degrees and forty degrees centigrade. The sterile suspension is especially suitable for ophthalmic use.

It is to be understood that various changes and modifications may be made in carrying out the present invention without departing from the spirit and scope thereof. Insofar as these changes and modifications are within the purview of the following claim, they are to be considered as part of the invention.

We claim:

A process for the preparation of a new crystalline form of cortisone acetate which is stable in aqueous vehicles comprising dissolving cortisone acetate in an inert water-miscible organic solvent, mixing with water, adding to the mixture a water-immiscible hydrocarbon solvent fraction obtained from a petroleum distillate in which said cortisone acetate is insoluble, said water-immiscible hydrocarbon solvent having a boiling point between about 25 and 150 degrees centigrade, co-distilling the resulting mixture to obtain a new form of crystalline cortisone acetate, 98 percent of the crystals thus obtained having a particle size between about forty and about sixty microns in length and further characterized by an ultraviolet extinction $E_{239}=15,800$, optical rotation $[\alpha]_D^{22}=178$ degrees (acetone), an optic axial angle of 76 degrees and the following X-ray diffraction data:

INTERPLANAR SPACING, A.

| | |
|---|---|
| 13.9 | 3.24 |
| 10.7 | 3.11 |
| 6.83 | 2.87 |
| 5.9 | 2.78 |
| 5.5 | 2.61 |
| 5.12 | 2.54 |
| 4.74 | 2.47 |
| 4.35 | 2.32 |
| 3.9 | 2.24 |
| 3.64 | 2.16 |
| 3.42 | |

References Cited in the file of this patent

UNITED STATES PATENTS

| | | |
|---|---|---|
| 2,671,750 | Macek | Mar. 9, 1954 |
| 2,779,707 | Jacobson | Jan. 29, 1957 |